(12) United States Patent
Nagu et al.

(10) Patent No.: US 11,667,829 B1
(45) Date of Patent: Jun. 6, 2023

(54) CORROSION INHIBITION COMPOSITIONS AND METHODS OF USE

(71) Applicant: Saudi Arabian Oil Company, Dhahran (SA)

(72) Inventors: Muthukumar Nagu, Dhahran (SA); Nayef M. Alanazi, Dhahran (SA); Jothibasu Ramasamy, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/700,977

(22) Filed: Mar. 22, 2022

(51) Int. Cl.
  *C10G 75/02* (2006.01)
  *C09K 8/54* (2006.01)

(52) U.S. Cl.
  CPC ............... *C09K 8/54* (2013.01); *C10G 75/02* (2013.01); *C09K 2208/32* (2013.01); *C10G 2300/4075* (2013.01)

(58) Field of Classification Search
  CPC .................................................. C10G 75/02
  See application file for complete search history.

(56) References Cited

U.S. PATENT DOCUMENTS

| | | | |
|---|---|---|---|
| 2,466,517 A | 4/1949 | Blair et al. | |
| 2,598,213 A | 5/1952 | Blair et al. | |
| 3,766,053 A | 10/1973 | Seffens | |
| 4,214,876 A * | 7/1980 | Garth | C23F 11/124 252/396 |
| 4,306,981 A | 12/1981 | Blair | |
| 4,316,808 A | 2/1982 | Blair | |
| 4,342,657 A | 8/1982 | Blair et al. | |
| 4,508,637 A * | 4/1985 | Heintzelman | C23F 11/126 252/396 |
| 4,511,366 A * | 4/1985 | Burrows | C10L 1/14 44/306 |
| 4,877,578 A | 10/1989 | Zetlmeisl et al. | |
| 5,556,575 A | 9/1996 | Babaian-Kibala et al. | |
| 5,961,885 A | 10/1999 | Eaton et al. | |
| 6,013,200 A | 1/2000 | Prince | |
| 6,448,411 B1 | 9/2002 | Meyer | |
| 7,057,050 B2 | 6/2006 | Meyer | |
| 7,951,754 B2 | 5/2011 | Tiwari et al. | |
| 8,618,027 B2 | 12/2013 | Meyer et al. | |
| 9,074,289 B2 | 7/2015 | Malwitz et al. | |
| 9,090,837 B2 | 7/2015 | Subramaniyam | |
| 9,834,718 B2 | 12/2017 | Amanullah et al. | |
| 10,131,859 B2 | 11/2018 | Wolf et al. | |
| 10,221,368 B2 | 3/2019 | Benitez Aguilar et al. | |
| 10,385,254 B2 | 8/2019 | Ramasamy et al. | |
| 2009/0065736 A1 | 3/2009 | Johnson et al. | |
| 2013/0302210 A1 | 11/2013 | Patel et al. | |
| 2020/0370185 A1 | 11/2020 | Shanti et al. | |

FOREIGN PATENT DOCUMENTS

| | | |
|---|---|---|
| CN | 102978624 | 3/2013 |
| EP | 1043423 | 10/2000 |

OTHER PUBLICATIONS

U.S. Appl. No. 17/700,978, filed Mar. 22, 2022, Nagu et al.
ASTM International, "Standard Guide for Evaluating and Qualifying Oilfield and Refinery Corrosion Inhibitors in the Laboratory" ASTM G170-06(2020)e1, Dec. 10, 2020, 16 pages.
ASTM International, "Standard Practice for Preparing, Cleaning, and Evaluating Corrosion Test Specimens" ASTM G1-03(2017)e1, Dec. 8, 2017, 9 pages.

* cited by examiner

*Primary Examiner* — Randy Boyer
(74) *Attorney, Agent, or Firm* — Fish & Richardson P.C.

(57) ABSTRACT

Compositions inhibit corrosion in various commercial settings, such as in a refinery and/or in an oil and gas application. The compositions include at least one fatty acid and at least two amphipathic molecules selected from the group consisting of dodecenyl succinic acid, dimer fatty acid and benzalkonium chloride.

20 Claims, No Drawings

CORROSION INHIBITION COMPOSITIONS AND METHODS OF USE

FIELD

The disclosure generally relates to corrosion inhibition compositions and methods of using such compositions to inhibit corrosion. The compositions and methods can be used in various settings, such as in a refinery and/or in oil and gas applications.

BACKGROUND

In general, corrosion can occur on metal components in refineries and systems and system components in oil and gas applications such as production, transportation and processing systems.

SUMMARY

The disclosure relates to compositions that can be used to inhibit corrosion in various settings, including, for example, refineries and oil and gas applications. The compositions can mitigate safety issues that may otherwise be caused by corrosion in such settings. The compositions can also reduce costs that would otherwise result due to corrosion in refineries and oil and gas applications. For example, one or more constituents of the compositions can be made from waste products, such as waste vegetable oil.

In some embodiments, the compositions include one or more solvents, one or more fatty acids derived from waste vegetable oil (a triglyceride), and at least two amphipathic molecules selected from dodecenyl succinic acid (DDSA), a dimer fatty acid and benzalkonium chloride.

In certain embodiments, the compositions can be used in settings where the presence of an acid can cause corrosion. As an example, in some embodiments, the compositions can be used in refineries to inhibit corrosion due to the presence of an acid, such as hydrochloric acid (HCl). In some embodiments, the compositions can be used in a refinery crude distillation unit. In some embodiments, the compositions can be used in a low temperature region of refinery overhead sections. As another example, in certain embodiments, the compositions can be used in an oil and gas application to inhibit corrosion due to the presence of an acid, such as a dissolved acid gas. An example of such a dissolved acid gases is dissolved carbon dioxide ($CO_2$), commonly referred to as a sweet environment. Another example of such a dissolved gas is hydrogen sulfide ($H_2S$), often referred to as a sour environment. In some embodiments, the compositions can inhibit corrosion in one or more oil and gas production systems, one or more oil and gas transportation systems, and/or one or more oil and gas processing systems.

Alternatively or additionally, the compositions can be used to inhibit corrosion under conditions of relatively high dissolved salt concentration, such as a relatively high concentration of dissolved sodium chloride (NaCl). Such conditions can be present, for example, in an oil and gas application (e.g., an oil and gas application in which dissolved carbon dioxide is present, an oil and gas application in which dissolved hydrogen sulfide is present).

In an aspect, the disclosure provides a composition that includes a fatty acid and at least two amphipathic molecules selected from dodecenyl succinic acid, dimer fatty acid and benzalkonium chloride.

In some embodiments, the composition further includes a solvent, and the composition includes 5-10% of the fatty acid. Optionally, the fatty acid is derived from waste vegetable oil. Optionally, the composition includes 2-10% of each of the at least two amphipathic molecules. Optionally, the solvent includes heavy aromatic naphtha. Optionally, the composition includes 60-90% of the solvent.

In some embodiments, the fatty acid is derived from waste vegetable oil.

In some embodiments, the fatty acid includes at least one member selected from oleic acid, linoleic acid and palmitic acid.

In some embodiments, the composition includes a plurality fatty acids. Optionally, the composition includes 5-10% of the fatty acids. Optionally, each of the fatty acids is derived from waste vegetable oil.

In some embodiments, the at least two amphipathic molecules include dodecenyl succinic acid and benzalkonium chloride, or the at least two amphipathic molecules include dimer fatty acid and benzalkonium chloride.

In some embodiments, the composition further includes a solvent, and the composition includes 2-10% of each of the at least two amphipathic molecules.

In some embodiments, the composition further includes a solvent, and the composition includes 60-90% of the solvent.

In some embodiments, the composition has a weight based corrosion inhibition efficiency of at least 20%.

In some embodiments, the composition has a rate based corrosion inhibition efficiency of at least 20%.

In an aspect, the disclosure provides a method that includes using a composition to inhibit corrosion. The composition includes a fatty acid and at least two amphipathic molecules selected from dodecenyl succinic acid, dimer fatty acid and benzalkonium chloride.

In some embodiments, corrosion is due to the presence of hydrochloric acid.

In an aspect, the disclosure provides a method that includes using a composition to inhibit corrosion of a metal component in a refinery. The composition includes a fatty acid and at least two amphipathic molecules selected from dodecenyl succinic acid, dimer fatty acid and benzalkonium chloride.

In an aspect, the disclosure provides a method that includes using a composition to inhibit corrosion due to the presence of a liquid including at least one member selected from a dissolved acid and a dissolved salt. The composition includes a fatty acid and at least two amphipathic molecules selected from dodecenyl succinic acid, dimer fatty acid and benzalkonium chloride.

In some embodiments, the corrosion is due to a dissolved acid including carbon dioxide.

In some embodiments, the corrosion is due to a dissolved acid including hydrogen sulfide.

In some embodiments, the corrosion is due to a dissolved salt.

In some embodiments, the liquid is present in an oil and gas application.

In some embodiments, the liquid is present during a process selected from an oil and gas production process, an oil and gas transportation process, and an oil and gas separation process.

In some embodiments, the method further includes treating waste vegetable oil to produce the fatty acid. Optionally, the composition further includes a solvent, and the composition includes 5-10% of the fatty acid. Optionally, the composition includes 2-10% of each of the at least two amphipathic molecules. Optionally, the composition includes 60-90% of the solvent.

In some embodiments, the composition includes a plurality of fatty acids. Optionally, the composition further includes a solvent, and the composition includes 5-10% of the fatty acids. Optionally, the method further includes treating waste vegetable oil to produce the fatty acids.

In some embodiments, the fatty acid includes at least two members selected from oleic acid, linoleic acid, palmitic acid.

In some embodiments, the composition further includes a solvent, and the composition includes 2-10% of each of the at least two amphipathic molecules.

In some embodiments, the composition further includes a solvent. Optionally, the composition includes 60-90% of the solvent. Optionally, the solvent includes heavy aromatic naphtha.

In some embodiments, the at least two amphipathic molecules include dodecenyl succinic acid and benzalkonium chloride, or the at least two amphipathic molecules include dimer fatty acid and benzalkonium chloride.

In an aspect, the disclosure provides a method that includes using a composition to inhibit corrosion due to the presence of a dissolved acid in a liquid present during a process selected from an oil and gas production process, an oil and gas transportation process, and an oil and gas separation process. The composition includes a fatty acid and at least two amphipathic molecules selected from dodecenyl succinic acid, dimer fatty acid and benzalkonium chloride.

DETAILED DESCRIPTION

Compositions

In general, the compositions according to the disclosure include a solvent, one or more fatty acids derived from waste vegetable oil (a triglyceride) and at least two amphipathic molecules selected from dodecenyl succinic acid (DDSA), a dimer fatty acid and benzalkonium chloride.

In general, any appropriate fatty acid can be used. In some embodiments, a fatty acid can have a relatively long chain length. Examples of fatty acids include saturated fatty acids, mono unsaturated fatty acids, polyunsaturated fatty acids, omega 3, omega 6 and omega 9. In some embodiments, a fatty acid is oleic acid, linoleic acid or palmitic acid. In certain embodiments, a composition can include more than one fatty acid. For example, a composition can include at least two fatty acids selected from oleic acid, linoleic acid and palmitic acid. In some embodiments, a composition includes oleic acid, linoleic acid and palmitic acid.

In embodiments in which a composition includes more than one fatty acid, the relative amount of each fatty acid can be selected as appropriate. As an example, in some embodiments, the total fatty acid content in a composition can be from 60-70 wt % (e.g., 60 wt %, 61 wt %, 62 wt %, 63 wt %, 64 wt %, 65 wt %, 66 wt %, 67 wt %, 68 wt %, 69 wt %, 70 wt %, 60-69 wt %, 60-68 wt %, 60-67 wt %, 60-66 wt %, 60-65 wt %, 60-64 wt %, 60-63 wt %, 60-62 wt %, 60-61 wt %, 61-70 wt %, 61-69 wt %, 61-68 wt %, 61-67 wt %, 61-66 wt %, 61-65 wt %, 61-64 wt %, 61-63 wt %, 61-62 wt %, 62-70 wt %, 62-69 wt %, 62-68 wt %, 62-67 wt %, 62-66 wt %, 62-65 wt %, 62-64 wt %, 62-63 wt %, 63-70 wt %, 63-69 wt %, 63-68 wt %, 63-67 wt %, 63-66 wt %, 63-65 wt %, 63-64 wt %, 64-70 wt %, 64-69 wt %, 64-68 wt %, 64-67 wt %, 64-66 wt %, 64-65 wt %, 65-70 wt %, 65-69 wt %, 65-68 wt %, 65-67 wt %, 65-66 wt %, 66-70 wt %, 66-69 wt %, 66-68 wt %, 66-67 wt %, 67-70 wt %, 67-69 wt %, 67-68 wt %, 68-70 wt %, 68-69 wt %, 69-70 wt %) oleic acid, 10-20 wt % (e.g., 10 wt %, 11 wt %, 12 wt %, 13 wt %, 14 wt %, 15 wt %, 16 wt %, 17 wt %, 18 wt %, 19 wt %, 20 wt %, 10-19 wt %, 10-18 wt %, 10-17 wt %, 10-16 wt %, 10-15 wt %, 10-14 wt %, 10-13 wt %, 10-12 wt %, 10-11 wt %, 11-20 wt %, 11-19 wt %, 11-18 wt %, 11-17 wt %, 11-16 wt %, 11-15 wt %, 11-14 wt %, 11-13 wt %, 11-12 wt %, 12-20 wt %, 12-19 wt %, 12-18 wt %, 12-17 wt %, 12-16 wt %, 12-15 wt %, 12-14 wt %, 12-13 wt %, 13-20 wt %, 13-19 wt %, 13-18 wt %, 13-17 wt %, 13-16 wt %, 13-15 wt %, 13-14 wt %, 14-20 wt %, 14-19 wt %, 14-18 wt %, 14-17 wt %, 14-16 wt %, 14-15 wt %, 15-20 wt %, 15-19 wt %, 15-18 wt %, 15-17 wt %, 15-16 wt %, 16-20 wt %, 16-19 wt %, 16-18 wt %, 16-17 wt %, 17-20 wt %, 17-19 wt %, 17-18 wt %, 18-20 wt %, 18-19 wt %, 19-20 wt %) linoleic acid, and/or 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) palmitic acid.

In general, the total amount of fatty acid(s) in the composition can be selected as appropriate. In some embodiments, the total amount of fatty acid(s) in the composition is 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) of the composition.

In general, triglycerides can be derived from any appropriate plant fat or animal fat. In some embodiments, the source of triglycerides is vegetable oil (e.g., fresh vegetable oil, waste vegetable oil). In some embodiments, the vegetable oil is waste vegetable oil. In some embodiments, the waste vegetable oil is a vegetable oil used for cooking. Examples of such vegetable oils include olive oil, palm oil, sunflower oil, corn oil and peanut oil. Optionally, more than one waste vegetable oil can be used in the preparation of one or more fatty acids used in a composition.

In certain embodiments, one or more fatty acids can be synthesized according to one or more methods disclosed in either (or both of) U.S. Pat. Nos. 10,385,254 and 9,834,718, which are hereby incorporated by reference in their entirety. Examples of methods of synthesizing a fatty acid from waste vegetable oil include reacting the triglycerides of the waste vegetable oil with a base, such as a hydroxide base, and one or more short chain alcohols (e.g., one or more of methanol, ethanol, propanol and butanol) to form glycerol and esters of fatty acids. The esters of fatty acids can then be reacted with a base, such as a hydroxide base, in water to form the fatty acids. Examples of hydroxide bases include sodium hydroxide (NaOH), potassium hydroxide (KOH), calcium hydroxide (Ca(OH)$_2$) or lithium hydroxide (LiOH). Optionally, hydrolysis of the triglycerides and/or esters of fatty acids can be performed with an acid rather than a base As noted above, a composition generally includes at least two amphipathic molecules selected from dodecenyl succinic acid (DDSA), a dimer fatty acid and benzalkonium chloride. As an example, a composition can contain DDSA and a dimer fatty acid. As another example, a composition can include DDSA and benzalkonium chloride. As further example, a composition can include a dimer fatty acid and benzalkonium chloride. As an additional example, a composition can include DDSA, a dimer fatty acid and benzalkonium chloride.

In general, any appropriate dimer fatty acid can be used. Examples of dimer fatty acids include C18 dimer fatty acids (e.g., CAS #61788-89-4), C24 dimer fatty acids, C32 dimer fatty acids and C36 dimer fatty acids.

In some embodiments, benzalkonium chloride can be added in the form of a mixture wherein more than one alkyl chain length is present (e.g., CAS #8001-54-5). In certain embodiments, benzalkonium chloride can be added in a form wherein only a single alkyl chain length is present.

Generally, the amount of the at least two amphipathic molecules can be selected as appropriate. In some embodiments, the total amount of the at least two amphipathic molecules in a composition is 5-15 wt % (e.g., 5 wt %, 6 wt %, 7 wt %, 8 wt %, 9 wt %, 10 wt %, 11 wt %, 12 wt %, 13 wt %, 14 wt %, 15 wt %, 5-14 wt %, 5-13 wt %, 5-12 wt %, 5-11 wt %, 5-10 wt %, 5-9 wt %, 5-8 wt %, 5-7 wt %, 5-6 wt %, 6-15 wt %, 6-14 wt %, 6-13 wt %, 6-12 wt %, 6-11 wt %, 6-10 wt %, 6-9 wt %, 6-8 wt %, 6-7 wt %, 7-15 wt %, 7-14 wt %, 7-13 wt %, 7-12 wt %, 7-11 wt %, 7-10 wt %, 7-9 wt %, 7-8 wt %, 8-15 wt %, 8-14 wt %, 8-13 wt %, 8-12 wt %, 8-11 wt %, 8-10 wt %, 8-9 wt %, 9-15 wt %, 9-14 wt %, 9-13 wt %, 9-12 wt %, 9-11 wt %, 9-10 wt %, 10-15 wt %, 10-14 wt %, 10-13 wt %, 10-12 wt %, 10-11 wt %, 11-15 wt %, 11-14 wt %, 11-13 wt %, 11-12 wt %, 12-15 wt %, 12-14 wt %, 12-13 wt %, 13-15 wt %, 13-14 wt %, 14-15 wt %).

In general, the amount of a given amphipathic molecule in the composition can be selected as appropriate. In certain embodiments, a composition includes 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) DDSA. In some embodiments, a composition includes 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) of a dimer fatty acid. In certain embodiments, a composition includes 2-5 wt % (e.g., 2 wt %, 3 wt %, 4 wt %, 5 wt %, 2-4 wt %, 2-3 wt %, 3-5 wt %, 3-4 wt %, 4-5 wt %) benzalkonium chloride. In certain embodiments, a composition includes 5-10 wt (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) DDSA and 2-5 wt % (e.g., 2 wt %, 3 wt %, 4 wt %, 5 wt %, 2-4 wt %, 2-3 wt %, 3-5 wt %, 3-4 wt %, 4-5 wt %) benzalkonium chloride. In certain embodiments, a composition includes 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) of a dimer fatty acid and 2-5 wt (e.g., 2 wt %, 3 wt %, 4 wt %, 5 wt %, 2-4 wt %, 2-3 wt %, 3-5 wt %, 3-4 wt %, 4-5 wt %) benzalkonium chloride.

Generally, any appropriate solvent can be used. In certain embodiments, the solvent is a heavy aromatic naphtha (CAS #64742-94-5), diesel, dimethyl sulfoxide (DMSO) or dimethylformamide. In certain embodiments, the solvent is heavy aromatic naphtha (CAS #64742-94-5). Optionally, more than one solvent can be used in a composition.

In general, the amount of solvent(s) present in a composition can be selected as appropriate. In certain embodiments, a composition includes 60-90 wt (e.g., 60-80 wt %, 60-70 wt %, 70-90 wt %, 70-80 wt %, 80-90 wt %) of the solvent(s).

In some embodiments, a composition includes: a) one or more fatty acids at a total fatty acid content of 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %); b) 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) DDSA; c) 2-5 wt % (e.g., 2 wt %, 3 wt %, 4 wt %, 5 wt %, 2-4 wt %, 2-3 wt %, 3-5 wt %, 3-4 wt %, 4-5 wt %) benzalkonium chloride; and d) 60-90 wt % (e.g., 60-80 wt %, 60-70 wt %, 70-90 wt %, 70-80 wt %, 80-90 wt %) heavy aromatic naphtha. In certain embodiments, a composition includes: a) one or more fatty acids at a total fatty acid content of 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %); b) 5-10 wt % (e.g., 5 wt %, 6 wt %, 7 wt %, 8 wt %, 9 wt %, 10 wt %, 5-9 wt %, 5-8 wt %, 5-7 wt %, 5-6 wt %, 6-10 wt %, 6-9 wt %, 6-8 wt %, 6-7 wt %, 7-10 wt %, 7-9 wt %, 7-8 wt %, 8-10 wt %, 8-9 wt %, 9-10 wt %) a dimer fatty acid; c) 2-5 wt % (e.g., 2 wt %, 3 wt %, 4 wt %, 5 wt %, 2-4 wt %, 2-3 wt %, 3-5 wt %, 3-4 wt %, 4-5 wt %) benzalkonium chloride; and d) 60-90 wt % (e.g., 60-80 wt %, 60-70 wt %, 70-90 wt %, 70-80 wt %, 80-90 wt %) heavy aromatic naphtha.

Corrosion Inhibition in Refineries

In some embodiments, a composition according to the disclosure can be used to inhibit corrosion in a refinery. Often, corrosion in refinery crude distillation units is caused by the condensation of one or more acids, such as hydrochloric acid, sulfuric acid, formic acid, acetic acid, propionic acid, butyric acid and valeric acid. In certain embodiments, corrosion in refinery crude distillation units is caused by the presence of a base, such as ammonium. In many cases, corrosion in a refinery crude distillation unit occurs on a metal component, such as a high alloy steel (e.g., a stainless steel component, such as an austenitic stainless steel component), a high chromium content steel component or a low-cost carbon steel component. In some embodiments, such a metal component is present in a region (e.g., a low temperature region, an overhead region) of a section (e.g., an overhead section) of a refinery. In some embodiments, a metal component susceptible to corrosion can include surfaces in the refinery process piping. such as overhead fin-fan coolers and top pump arounds, and equipment, such as crude distillation units (CDU), vacuum distillation units (VDU), naphtha hydrotreater unit (NHT) stripper overhead, kerosene hydrotreater unit (KHU), diesel hydrotreater (DHT) unit, hydrocracker unit (HCU), vacuum gas oil (VGO) hydrotreater unit.

Generally, a composition according to the disclosure can be used to inhibit corrosion by including it in a refinery liquid (e.g., crude oil, light naphtha, heavy naphtha, diesel fraction ($C_5$-$C_{10}$)) at any appropriate pH. In some embodiments, the refinery liquid has a neutral pH (e.g. a pH between 5 and 8). In certain embodiments, the refinery liquid has a low pH (e.g. a pH between 2 and 5). In some embodiments, the refinery liquid has a pH of at least 2 (e.g., at least 3, at least 4, at least 5) and at most 8. In certain embodiments, the refinery liquid has a pH of 2-7 (e.g., 2-6, 2-5, 2-4, 2-3, 3-8, 3-7, 3-6, 3-5, 3-4, 4-8, 4-7, 4-6, 4-5, 5-7, 5-6, 6-7, 2, 3, 4, 5, 6, 7).

In general, the compositions can be used at any appropriate concentration in a refinery liquid. In some embodiments, a composition is added at one or more injection addition points in the overhead section of the CDU. In some embodiments, the compositions described herein are employed at a concentration of 10-1,000 ppm (e.g. 10 ppm, 20 ppm, 50 ppm, 100 ppm, 200 ppm, 300 ppm, 400 ppm, 500 ppm, 600 ppm, 700, ppm, 800 ppm, 900 ppm, 1,000 ppm, 10-500 ppm, 10-200 ppm, 10-100 ppm, 10-50 ppm, 50-1,000 ppm, 50-500 ppm, 50-200 ppm, 50-100 ppm, 100-1,000 ppm, 100-500 ppm, 100-200 ppm, 200-1,000 ppm, 200-500 ppm, 500-1,000 ppm) in a refinery liquid.

Compositions according to the disclosure can exhibit good corrosion inhibition under conditions intended to mimic those present in a refinery. In some embodiments, this ability can be measured as a weight based corrosion inhibition efficiency. According to the disclosure, weight based corrosion inhibition efficiency is measured using a rotating cage autoclave corrosion in experiments intended to mimic corrosion conditions that could be present in a refinery. The test is performed in accordance with ASTM G170. The corrosion specimen is carbon steel (C1018). 315 ml of synthetic naphtha (10 wt % cyclohexane, 10 wt % toluene, 20 wt % kerosene, 20 wt % octane, 20 wt % iso-octane and 20 wt % heptane) is disposed in the rotating cage autoclave cell, and 35 ml of acid brine (see Table 3 below) is added to make a 90:10 ratio of hydrocarbon:acid brine ratio in the autoclave. An amount of a composition according to the disclosure is added separately to the test solution and mixed well. The corrosion specimen is mounted in an autoclave. Stirring is performed at 500 rpm with continuous nitrogen gas purging for about 30-45 minutes to remove the oxygen in the system, then the cage speed is increased to 1,000 rpm. The autoclave is closed and the temperature is increased to 110° C. The mixture is mixed at 1,000 rpm for 3 hours. The autoclave is then cooled to a temperature of 25° C. The corrosion specimen is removed and cleaned with toluene/acetone then with Clarke's solution (ASTM G1) to remove the corrosion product. The corrosion specimens is subsequently dried and weighed. The weight based corrosion inhibition efficiency (%) is calculated according to the following equation.

$$\text{Weight Based Corrosion Inhibition Efficiency}(\%) = \left(\frac{WL_0 - WL_{CI}}{WL_0}\right) \times 100$$

where $WL_{CI}$ is the weight loss of the corrosion specimen according to the above-described test in the presence of a composition according to the disclosure, and $WL_0$ is the weight loss of the corrosion specimen according to the above-described test in the absence of a composition according to the disclosure.

In some embodiments, a composition according to the disclosure has a weight based corrosion inhibition efficiency at least 20% (e.g., at least 30%, at least 40%, at least 50%, at least 60%, at least 70%, at least 80%, at least 85%, at least 90%, at least 95%).

Corrosion Inhibition in Oil and Gas Applications

In some embodiments, a composition according to the disclosure can be used to inhibit corrosion of a liquid present in an oil and gas application, such as a wellhead fluid, produced water and/or oil. In general, corrosion in an oil and gas application is mainly due to the presence of acid gases (e.g., carbon dioxide, hydrogen sulfide) and/or a relatively high concentration of salt (e.g. NaCl), sulfate (SW) and/or bicarbonate ($HCO_3^-$) in the liquid.

In some embodiments, corrosion occurs in a sweet environment in which carbon dioxide is dissolved in one or more of the liquids. In certain embodiments, the pH of a sweet environment is between 4.5-6.5 (e.g. 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 4.5-6.0, 4.5-5.5, 4.5-5.0, 5.0-6.5, 5.0-6.0, 5.0-5.5, 5.5-6.5, 5.5-6.0, 6.0-6.5). In certain embodiments, corrosion occurs in a sour environment in which hydrogen sulfide is dissolved in one or more of the liquids. In some embodiments, the pH of the sour environment is between 4.5-6.5 (e.g. 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 4.5-6.0, 4.5-5.5, 4.5-5.0, 5.0-6.5, 5.0-6.0, 5.0-5.5, 5.5-6.5, 5.5-6.0, 6.0-6.5). In some embodiments, corrosion is caused by a dissolved salt, such as sodium chloride, which may be present at a concentration of at least 1 wt % (e.g., at least 2 wt %, at least 3 wt %, at least 3.5 wt %) in one or more of the liquids. In certain embodiments, the one or more liquids may contain a dissolved acid (e.g., carbon dioxide, hydrogen sulfide) and a concentration of at least 1 wt % (e.g., at least 2 wt %, at least 3 wt %, at least 3.5 wt %) of a dissolved salt, such as sodium chloride.

In certain embodiments, a composition according to the disclosure is used to inhibit corrosion in an oil and gas production system. In some embodiments, a composition according to the disclosure is used to inhibit corrosion in an oil and gas transportation system. In certain embodiments, a composition according to the disclosure is used to inhibit corrosion in an oil and gas processing system. In certain embodiments, a composition according to the disclosure is used to inhibit corrosion in one or more oil wells, one or more production lines, one or more transporting pipelines, and/or one or more gas oil separation plants (GOSPs). In certain embodiments, a composition according to the disclosure is used to inhibit corrosion in one or more oil and gas production processes, one or more oil and gas transportation processes, and/or an oil and gas separation processes.

In some embodiments, a metal component of an oil and gas application is susceptible to corrosion. For example, such a metal component can be made of a stainless steel (e.g., high alloy steels including stainless steels, austenitic stainless steels), a high chromium content steel, or a low-cost carbon steel. A composition according to the disclosure can be used to inhibit corrosion of such metal components.

In general, the compositions can be used at any appropriate concentration in the one or more liquids. In certain embodiments, a compositions is added in a flow line, a trunk line, and/or a gas oil separation plant (GOSP). In some embodiments, a composition is added using a corrosion inhibitor injection kit. In some embodiments, the compositions described herein are employed at a concentration of 10-1,000 ppm (e.g. 10 ppm, 20 ppm, 50 ppm, 100 ppm, 200 ppm, 300 ppm, 400 ppm, 500 ppm, 600 ppm, 700, ppm, 800 ppm, 900 ppm, 1,000 ppm, 10-500 ppm, 10-200 ppm, 10-100 ppm, 10-50 ppm, 50-1,000 ppm, 50-500 ppm, 50-200 ppm, 50-100 ppm, 100-1,000 ppm, 100-500 ppm, 100-200 ppm, 200-1,000 ppm, 200-500 ppm, 500-1,000 ppm) in the one or more liquids.

Compositions according to the disclosure can exhibit good corrosion inhibition under conditions intended to mimic those present in an oil and gas application. In some embodiments, this ability can be measured as a rate based corrosion inhibition efficiency. According to the disclosure, the rate based corrosion inhibition efficiency is determined using the Linear Polarization Resistance technique (LPR) to obtain the polarization resistance (Rp) using a three electrode system including: (i) a platinum electrode as the counter electrode; (ii) a standard calomel electrode (SCE) as the reference electrode; and (iii) carbon steel (C1018) as the working electrode, in accordance to ASTM method G59-97. This measurement is to mimic corrosion conditions that may be present in oil and gas applications. The LPR measurements is performed using a glass setup with the volume capacity of 1,000 ml connected to a potentiostat interface 1010E (Gamry Instruments). The carbon steel C1018 working electrode is in a 3.5 wt % NaCl aqueous solution and is used to measure the corrosion for 72 hours. Throughout the experiment, the experimental setup is purged constantly with $CO_2$ at a constant rate (25 ml/min), and the temperature is maintained at 60° C. 100 ppm of a composition according to the disclosure is injected after a stable baseline is obtained, and the LPR corrosion rate is monitored for the duration of the experiment. The LPR corrosion rate, in mpy, is calculated according to the following equation.

$$LPR \text{ Corrosion Rate} = \left(\frac{0.13\ I_{corr} EW}{d}\right)$$

where EW is the equivalent weight of the corrosion specimen in g, d is the density of the corrosion specimen in $g/cm^2$ and $I_{corr}$ is the corrosion current density in $\mu A/cm^2$.

The rate based corrosion inhibition efficiency (%) of is calculated as:

$$\text{Rate Based Corrosion Inhibition Efficiency}(\%) = \left(\frac{CR_0 - CR_{CI}}{CR_0}\right) \times 100$$

where $CR_{CI}$ is the LPR corrosion rate according to the above-described test in the presence of a composition according to the disclosure, and $CR_0$ is the LPR corrosion rate according to the above-described test in the absence of a composition according to the disclosure.

In some embodiments, a composition according to the disclosure has a rate based corrosion inhibition efficiency at least 20% (e.g., at least 25%, at least 30%, at least 40%, at least 50%, at least 60%, at least 70%, at least 80%, at least 90%, at least 95%, at least 98%, 100%) in sweet corrosion environmental conditions (in the presence of dissolved carbon dioxide). Such sweet corrosion environmental conditions may also include a salt concentration (e.g., a sodium chloride concentration) of at least 1 wt % (e.g., at least 2 wt %, at least 3 wt %, at least 3.5 wt %). In certain embodiments, the compositions have a corrosion inhibition percent of least above 20% (e.g., at least 25%, at least 30%, at least 40%, at least 50%, at least 60%, at least 70%, at least 80%, at least 90%, at least 95%, at least 98%, 100%) in sour corrosion environmental conditions (in the presence of dissolved hydrogen sulfide). Such sour corrosion environmental conditions may also include a salt concentration (e.g., a sodium chloride concentration) of at least 1 wt % (e.g., at least 2 wt %, at least 3 wt %, at least 3.5 wt %).

EXAMPLES

Compositions

Fatty acids were synthesized from waste vegetable oil. The waste vegetable oil was converted into glycerol and methyl ester of fatty acid by base hydrolysis using NaOH with methanol as described in U.S. Pat. No. 9,834,718. Methanol, e.g., 20% original waste vegetable oil volume, and NaOH (e.g., 4.22 g NaOH/liter of waste vegetable oil) were mixed in a highly dry condition using a magnetic stirrer and then added to the waste vegetable oil in a container. The mixture was then stirred for six hours using the magnetic stirrer. The glycerol was sedimented and the esterified oil was separated and washed.

The methyl esters of fatty acids were hydrolyzed using NaOH in water to provide fatty acids as described in U.S. Pat. No. 10,808,161, which is hereby incorporated by reference in its entirety. 15 g of NaOH was added to 50 mL of water and was added to 30 mL of methyl ester with stirring. The mixture was stirred for 6 hours at 60° C. then allowed to be static for 16 hours. 50 mL of water was added to the mixture. Hydrochloric acid was added dropwise to the mixture to reduce the pH to 4-5. An oil phase then separated out from the reaction mixture. The non-aqueous phase was washed and remaining water was removed. The chemical compositions of the fatty acids were characterized by high performance liquid chromatography and presented in Table 1.

TABLE 1

| Name of the fatty acid | Composition (%) |
| --- | --- |
| Oleic acid | around 60-70% |
| Linoleic acid | around 10-20% |
| Palmitic acid | around 5-10% |

Table 2 lists the constituents (by weight percentage) of three compositions that were tested. The fatty acids from waste vegetable oil was the composition listed in Table 1.

TABLE 2

| Composition | Fatty acids from waste vegetable oil | Dodecenyl succinic acid (DDSA)- (CAS# 11059-31-7) | Dimer fatty acid (CAS# 61788-89-4) | Benzalkonium chloride (CAS# 8001-54-5) | Heavy aromatic naphtha (HAN)- (CAS# 64742-94-5) |
| --- | --- | --- | --- | --- | --- |
| Composition 1 | 20 | — | — | — | 80 |
| Composition 2 | 5 | 5 | — | 2 | 88 |
| Composition 3 | 5 | — | 5 | 2 | 88 |

Corrosion Inhibition in Refineries

The weight based corrosion inhibition efficiency for each of the compositions in Table 2 was determined using the method described above. The carbon steel (C1018) corrosion specimen weighed approximately 19.5896 g, had a density of 7.87 $g/cm^3$, and an area of 3 square inches. The constituents of the acid brine solution are listed in Table 3.

TABLE 3

| Chemical name | Concentration (ppm) |
| --- | --- |
| Hydrochloric acid (HCl) | 1500 |
| Sulfuric acid ($H_2SO_4$) | 730 |
| Acetic acid ($CH_3COOH$) | 120 |
| Propionic Acid ($C_2H_5COOH$) | 150 |
| Butyric acid ($C_3H_7COOH$) | 125 |
| Valeric acid ($C_4H_9COOH$) | 200 |
| Ammonia ($NH_3$) | 135 |

The autoclave corrosion rate in MPY (mils per year) was calculated as:

$$\text{Autoclave Corrosion Rate} = \frac{534 \times WL_{mg}}{D \times A \times TD}$$

where $WL_{mg}$ is the weight loss is the loss of weight of the corrosion specimen in mg, D is the density of the corrosion specimen in gm/cc, A is the area is the surface area of the corrosion specimen exposed to the liquid in square inches and TD is the test duration in hours.

The weight based corrosion inhibition efficiencies of the compositions were tested at a pH of 5.2 and a pH of 2. For experiments performed at a pH of 5.2, ethanolamine was added in the acid brine solution to attain the desired pH. The results are presented in Tables 4 and 5 for pH 5.2 and pH 2, respectively.

TABLE 4

| Experimental System | Corrosion inhibitor composition | Concentration (PPm) | Autoclave Corrosion Rate (mpy) | Weight Based Corrosion Inhibition Efficiency |
|---|---|---|---|---|
| Synthetic naphtha:acid brine (90:10 ratio)-(Blank) | | 0 | 135 | NA |
| Synthetic naphtha:acid brine (90:10 ratio) | Composition 1 | 200 | 24 | 82% |
| Synthetic naphtha:acid brine (90:10 ratio) | Composition 2 | 50 | 12 | 91% |
| Synthetic naphtha:acid brine (90:10 ratio) | Composition 3 | 200 | 17 | 88% |

TABLE 5

| Experimental System | Corrosion Inhibitor Composition | Concentration (PPm) | Autoclave Corrosion Rate from (mpy) | Weight based Corrosion Inhibition Efficiency |
|---|---|---|---|---|
| Synthetic naphtha:acid brine (90:10 ratio)-(Blank) | | 0 | 244 | NA |
| Synthetic naphtha:acid brine (90:10 ratio) | Composition 1 | 500 | 183 | 25% |
| Synthetic naphtha:acid brine (90:10 ratio) | Composition 2 | 100 | 7 | 97% |
| Synthetic naphtha:acid brine (90:10 ratio) | Composition 3 | 200 | 20 | 92% |

The experiments showed that corrosion of metal surfaces in refinery process piping (overhead fin-fan coolers, top pump arounds) and equipment (CDU and VDU) could be inhibited by compositions according to the disclosure.

Inhibiting Corrosion in Oil and Gas Applications

The LPR corrosion rate and rate based corrosion inhibition efficiency of the compositions in Table 2 were determined using the method described above. Table 6 lists the LPR corrosion rate and the rate based corrosion inhibition efficiency for the compositions in Table 2.

TABLE 6

| Corrosion Inhibitor Composition | Concentration of Composition (PPm) | LPR Corrosion Rate (mpy) | Rate based Corrosion Inhibition Efficiency |
|---|---|---|---|
| Blank (without corrosion inhibitor) | 0 | 192 | NA |
| Composition 2 | 100 | 0.001 | 100% |
| Composition 3 | 100 | 135 | 30% |

The formulated corrosion inhibitors showed good rate based corrosion inhibition efficiency in sweet corrosion environmental conditions (60° C. and presence of carbon dioxide; 3.5 wt % NaCl in the test solution). 100% corrosion inhibition was attained with Composition 2 at a concentration of 100 ppm. The LPR corrosion rate was 0.001 mpy with Composition 2, whereas the blank LPR corrosion rate was 192 mpy in 3.5 wt % sodium chloride solution in the presence of $CO_2$ at 60° C.

OTHER EMBODIMENTS

While only certain embodiments have been set forth, the disclosure is not limited to such embodiments.

As an example, in some embodiments, in addition to one or more compositions according to the disclosure, other corrosion inhibitors can be used. Examples of such corrosion inhibitors include nitrogen-based compounds, such as imidazolines, amido-amines and pyrimidine salts.

As another example, in certain embodiments, a metal component susceptible to corrosion may be at least partially coated to help reduce corrosion of the metal component.

As a further example, certain environments have been described in which the compositions according to the disclosure can be used, the disclosure is not limited to such uses. More generally, the compositions can be used in any appropriate environment. For example, the compositions can be used to inhibit corrosion in petroleum products transportation pipelines.

Other embodiments are encompassed by the claims.

What is claimed is:

1. A method, comprising:
   disposing a composition into a first liquid comprising at least one first member selected from the group consisting of a dissolved acid and a dissolved salt, thereby forming a second liquid; and
   contacting the second liquid with a second member selected from the group consisting of a component of a refinery, a component of an oil and gas production system, a component of an oil and gas transportation system, and an oil and gas processing system, thereby inhibiting corrosion of the second member,
   wherein the composition comprises:
      a fatty acid;
      at least two amphipathic molecules selected from the group consisting of dodecenyl succinic acid, dimer fatty acid and benzalkonium chloride; and
      a solvent, and
      wherein the composition comprises from 2-10% of each of the at least two amphipathic molecules.

2. The method of claim 1, wherein the corrosion of the second member is due to a dissolved acid comprising carbon dioxide.

3. The method of claim 1, wherein the corrosion of the second member is due to a dissolved acid comprising hydrogen sulfide.

4. The method of claim 1, wherein the corrosion of the second member is due to a dissolved salt.

5. The method of claim 1, wherein the first liquid is present in an oil and gas application.

6. The method of claim 1, wherein the first liquid is present during a process selected from the group consisting of an oil and gas production process, an oil and gas transportation process, and an oil and gas separation process.

7. The method of claim 1, further comprising treating waste vegetable oil to produce the fatty acid.

8. The method of claim 7, wherein the composition comprises 5-10% of the fatty acid.

9. The method of claim 1, wherein the composition comprises 60-90% of the solvent.

10. The method of claim 1, wherein the composition comprises a plurality of fatty acids.

11. The method of claim 10, wherein the composition comprises 5-10% of the fatty acids.

12. The method of claim 10, further comprising treating waste vegetable oil to produce the fatty acids.

13. The method of claim 1, wherein the fatty acid comprises at least two members selected from the group consisting of oleic acid, linoleic acid, palmitic acid.

14. The method of claim 1, wherein the solvent comprises heavy aromatic naphtha.

15. The method of claim 1, wherein the at least two amphipathic molecules comprise dodecenyl succinic acid and benzalkonium chloride, or the at least two amphipathic molecules comprise dimer fatty acid and benzalkonium chloride.

16. A method, comprising:
   disposing a composition into a first liquid comprising a dissolved acid, thereby forming second liquid; and
   contacting the second liquid with a member selected from the group consisting of a component of an oil and gas production system, a component of an oil and gas transportation system, and an oil and gas processing system, thereby inhibiting corrosion of the member, wherein the first liquid is present during a process selected from the group consisting of an oil and gas production process, an oil and gas transportation process, and an oil and gas separation process,
   wherein the composition comprises:
      a fatty acid;
      at least two amphipathic molecules selected from the group consisting of dodecenyl succinic acid, dimer fatty acid and benzalkonium chloride; and
      a solvent, and
      wherein the composition comprises from 2-10% of each of the at least two amphipathic molecules.

17. The method of claim 1, wherein the composition comprises 5 wt. % fatty acid, 5 wt. % dodecenyl succinic acid and 2 wt. % benzalkonium chloride.

18. The method of claim 17, wherein the solvent comprises heavy aromatic naphtha, and the composition comprises 88 wt. % the heavy aromatic naphtha.

19. The method of claim 1, wherein the composition comprises 5 wt. % fatty acid, 5 wt. % dimer fatty acid, and 2 wt. % benzalkonium chloride.

20. The method of claim 19, wherein the solvent comprises heavy aromatic naphtha, and the composition comprises 88 wt. % the heavy aromatic naphtha.

* * * * *